United States Patent [19]
Nelson

[11] Patent Number: 4,569,951
[45] Date of Patent: Feb. 11, 1986

[54] POLYMERS PREPARED BY REACTION OF A POLYISOCYANATE WITH A SECONDARY AMINE TERMINATED ADDUCT OF A PRIMARY AMINE COMPOUND AND A POLYEPOXIDE

[75] Inventor: Donald L. Nelson, Lake Jackson, Tex.

[73] Assignee: The Dow Chemical Company, Midland, Mich.

[21] Appl. No.: 692,797

[22] Filed: Jan. 18, 1985

[51] Int. Cl.$^4$ .............................................. C08G 18/14
[52] U.S. Cl. .................................... 521/167; 252/182; 525/528; 528/76; 528/77; 528/79
[58] Field of Search ......................... 521/167; 525/528; 528/76, 77, 79; 252/182

[56] References Cited

U.S. PATENT DOCUMENTS 3,445,436 5/1969 Lake et al. ............................. 528/77
4,143,009 3/1979 Dewey ................................ 521/167
4,394,463 7/1983 Cuscurida et al. .................. 521/167

Primary Examiner—Maurice J. Welsh
Attorney, Agent, or Firm—Gary C. Cohn

[57] ABSTRACT

Polymers having high impact strength, high modulus and high heat distortion temperatures are prepared by reacting a polyisocyanate with a secondary amine terminated adduct of a polyepoxide and a primary amine.

15 Claims, No Drawings

POLYMERS PREPARED BY REACTION OF A POLYISOCYANATE WITH A SECONDARY AMINE TERMINATED ADDUCT OF A PRIMARY AMINE COMPOUND AND A POLYEPOXIDE

BACKGROUND OF THE INVENTION

This invention relates a polyurea-containing polymers, more particularly to polyurea-containing polymers prepared in the reaction of a polyisocyanate with a secondary amine-terminated polyepoxide compound.

In the preparation of polyurea and/or polyurethane polymers it is often desirable to prepare a polymer having the properties of high heat distortion temperature, good impact strength and high modulus. In practice, however, it has often been found that optimization of one of these properties tends to cause a decrease in one or more of the others. For example, high heat distortion polymers have often been found to be lacking in impact strength. Similarily, high modulus polymers have often been found to be lacking in both heat distortion and impact properties. Accordingly, it would be desirable to provide a polyurea and/or polyurethane polymer having good heat distortion, modulus and impact strength.

SUMMARY OF THE INVENTION

This invention comprises a polyurea-containing polymer prepared in a reaction of a reaction mixture comprising a polyisocyanate and a secondary amine-terminated reaction product of a monofunctional primary amine-containing compound and a polyepoxide.

In another aspect, this invention is an active hydrogen containing composition comprising a secondary amine reaction product of a monofunctional primary amine-containing compound and a polyepoxide, and at least one other isocyanate reactive material.

The polymer of this invention is characterized in having good heat distortion, impact strength and flexural modulus. As such, these polymers are especially useful as structural polymers as well as static or dynamic elastomers.

DETAILED DESCRIPTION OF THE INVENTION

The polymer of this invention is prepared in the reaction of a reaction mixture comprising a polyisocyanate and a secondary amine-terminated reaction product of a monofunctional primary amine containing compound and a polyepoxide.

Among the polyepoxides usefully employed herein to prepare the secondary amine-terminated reaction product are those represented by the general structure

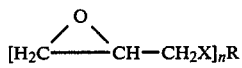
I.

wherein X is the residue of an active hydrogen-containing moiety after removal of said active hydrogen, R is an organic polyradical and n is at least 2. n is preferably from about 2 to 4, more preferably about 2 to 3 and most preferably about 2 to about 2.3. Such polyepoxides are advantageously prepared by reacting a compound having a plurality of groups containing active hydrogen atoms with a halogen-containing oxirane such as epichlorohydrin or epibromohydrin.

In structure I, the group X is advantageously

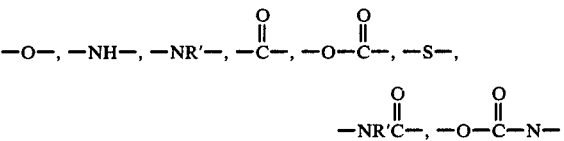

or a similar group, wherein R' is lower alkyl. Preferably, the group X is —O— and the polyepoxide is one prepared in the reaction of a polyhydroxyl containing compound with a halogenated oxirane as discussed above.

Exemplary polyepoxides include epoxy-terminated derivatives of bisphenols, such as are represented by the structure

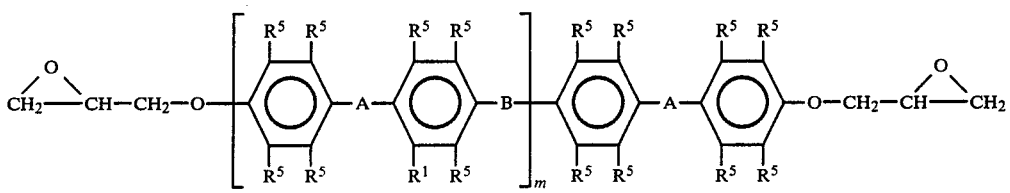
II.

wherein each A is independently a lower alkylene group such as methylene, ethylene, isopropylidine and the like, —O—, —S—,

and the like, each B is as defined by A, and/or OCH$_2$CHOHCH$_2$O—, each R$^5$ is independently hydrogen, halogen or lower alkyl, and m is a number from about 0 to about 30, preferably 0 to about 10 and more preferably about 0.1 to about 3. In addition, derivatives of the materials represented by structure II in which one or more of the positions on the group A is substituted with an inert substitutent such as halogen, aryl, alkyl and the like are also useful herein. Suitable such epoxides in include the commercially available resinous reaction products of an epihalohydrin with the the diverse bisphenols and halogenated bisphenols, particularly the reaction products of an epihalohydrin with bisphenol A or bisphenol F or halogenated derivates thereof. These resins preferably have an average equivalent weight from about 170 to about 2000. Suitable such epoxy resins include those sold commercially as DER* 317, DER 330, DER 331, DER 332, DER 333, DER 337, DER 642U, DER 661, DER 662, DER 663U, DER 664, DER 664U, DER 667, DER 643MF, DER 542, DER 511-A80, DER 521-A75, and DER 599 epoxy resins all available from The Dow Chemical Company. Also suitable are the corresponding aromatic glycidyl amine resins wherein the various ether linkages are replaced by —NH— groups.

*Trademark of The Dow Chemical Company

Also useful herein are the so called polynuclear phenol glycidyl ether derived resins.

Also suitable, but less prefered due to the higher epoxy functionality, are the so-called epoxy phenol novolac resins and epoxy cresol novolac resins which can be represented by the structure

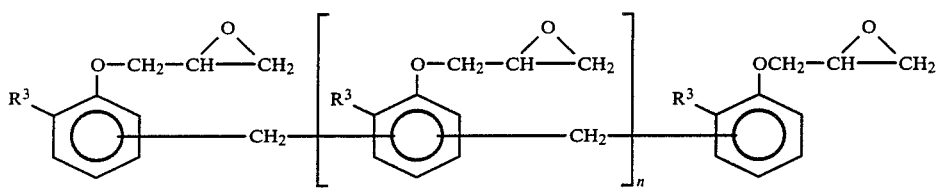

III.

wherein n is a number from about 0–20 and each $R^3$ is independently hydrogen, halogen, lower alkyl, aryl or aralkyl. Halogenated derivatives of such resins are also useful herein.

In addition, epoxy resins prepared by reacting an organic dien with an aromatic hydroxyl-containing compound and subsequently reacting the resulting product with an epihalohydrin, as are described in U.S. Pat. No. 4,390,680 to Nelson, are useful herein.

Suitable aliphatic epoxy resins include the hydrogenated derivatives of the foregoing aromatic epoxy resins as well as those in which the group R of Structure I is lower alkylene, especially ethylene and isopropylene, a dialkylene ether or a polyoxyalkylene group. Such resins are advantageously prepared by reacting an alkylene glycol or polyether polyol with an epihalohydrin. Examples of such resins include DER 732 and DER 736, both of which are available from The Dow Chemical Company.

Also useful are aliphatic epoxy resins prepared in reaction of cycloolefins with peracetic acid, as well ad diglycidyl ethers of cyclic dicarboxylic acids.

The epoxy resin is reacted with a stoichiometric excess of a primarily monofunctional organic primary amine in order to "cap" the resin with a terminal secondary amine group. The primary amine is preferably primarily monofunctional in order to minimize the polymerization of the epoxy resin. Preferably, the primary amine contains less than about 15, preferably less than about 10, more preferably less than about 5 weight percent of polyamine compounds. The primary amine if advantageously represented by the structure $$R^4NH_2$$

wherein $R^4$ is alkyl, aryl or aralkyl having from about 2 to about 30 carbon atoms. Suitable such amines include ethylamine, N-propylamine, isopropylamine, N-, —iso—, or sec-butyl amine, stearyl amine, oleyl amine, aniline, o-ethyl aniline and the like. Preferred are alkyl amines having from about 2–8 carbon atoms, and aromatic amines having from about 6–12 carbon atoms.

The reaction product of the primary amine in the polyepoxide can be prepared by simply heating the polyepoxide and primary amine together for a period of time sufficient to complete the reaction thereof. A temperature of about 20°–150° C. is typically employed. Typically a large excess, i.e. 2 to 15 molar excess, of the amine is employed in order to minimize the formation of high molecular weight materials. The excess amine also acts as a diluent. It is often advantageous, particularly when a viscous or solid polyepoxide is employed, to conduct the reaction in a suitable solvent for the polyepoxide. Ketones and alcohols, particularly methylethyl ketone and propylene glycol monomethyl ether, are suitable solvents.

The time and temperature employed in the reaction depends somewhat on the particular amine employed. Lower molecular weight amines generally react more readily than higher molecular weight amines. In general, a temperature from about 0° to 120° C., preferably from about 30° to 80° C., and a reaction time from about 3 minutes to about 20 hours is suitable.

It is desirable to add the polyepoxide to the amine gradually in order to facilitate control of the reaction.

Following the reaction of the primary amine and the polyepoxide, any unreacted primary amine (and solvent, if any) are advantageously removed from the product adduct by any suitable technique. Vacuum distillation is a useful technique for this purpose.

The aforementioned reaction product contains terminal secondary amine groups which can react with isocyanate groups to form urea linkages. These amine groups can be reacted with a polyisocyanate to form a polyurea containing polymer. The reaction of the adduct with a polyisocyanate can be conducted at ambient or a somewhat elevated temperature. A catalyst such as a tertiary amine compound or an organo metallic compound can be used if desired. Suitable conditions for conducting polyamine-polyisocyanate polymerization reactions are described in U.S. Pat. No. 4,444,910, the relevant portions which are incorporated herein by reference.

In addition, the reaction product of the primary amine and the polyepoxide also contains secondary hydroxyl groups which can also react with a polyisocyanate to form a urethane linkage. This secondary hydroxyl is significantly less reactive than the secondary amine groups, and generally requires more strigent reaction conditions, i.e. higher temperatures and/or the use of a catalyst, to react. Thus, the reaction conditions can be chosen such that few if any of these hydroxyl groups react with the polyisocyanate, thereby forming a more linear polymer or such that a significant proportion thereof react, forming a more crosslinked structure.

It is often advantageous to employ, in addition to the forementioned adduct, other isocyanate reactive materials such as a relatively high equivalent weight polyol, polymercaptan or polyamine in the preparation of polymer according to this invention. Suitable polyols include polyether polyols, polyester polyols, polyhydroxyl containing-phosphorous compounds, hydroxyl-terminated acetyl resins, hydroxy-terminated amines and polyamines, and the so-called polymer or copolymer polyols which comprise a dispersion of polymer or copolymer in a continuous polyol phase. Examles of these and other suitable polyols are described more fully in U.S. Pat. No. 4,294,491, particularly in columns 3–5 thereof. Suitable copolymer polyols include those described in U.S. Pat. No. RE 29118, RE 28715 and 4,394,491. The analogous mercaptan-terminated materials are likewise useful herein. Suitable polyamines include the corresponding amine terminated polyether and polyester polyols.

Preferably, a relatively high equivalent weight compound having from about 2-4 hydroxyl groups, amine groups or mixtures thereof and a equivalent weight from about 250–5000 (based on the number of hydroxyl and/or amine groups) are used herein. Of particular interest herein are the polyether polyols, polyester polyols and corresponding amine terminated polyether-and polyester polyols to 3000. Suitable amine terminated polyethers include those described in U.S. Pat. No. 3,666,788 to Rowton and those commercially available from Texaco Chemical Company under the tradenames Jeffamine D-2000, Jeffamine T-5000 and the like. It has also been found most prefered to employ at least one of an amine-terminated polyether or an amine initiated-polyol in preparing polymers according to this invention. Suitable amine initiated polyols include alkylene oxide adducts of ammonia polyamines such as ethylene diamine, diethylene triamine, aminoethylpiperazine and the like having an equivalent weight from about 250 to 2000.

Alternatively, or in addition to the relatively high equivalent weight polyol or amine terminated polyol, a relatively low equivalent weight polyol or polyamine is often useful in preparing polymers according to this invention. Such relatively low equivalent weight materials include those having from about 2–8 hydroxyl groups, amine groups or mixtures thereof and an equivalent weight (based on the number of amine and/or hydroxyl groups) of about 30 to 250. Typical relatively low equivalent weight hydroxyl terminated materials include, but are not limited to, ethylene glycol, diethylene glycol, triethylene glycol, propylene glycol, low molecular weight polymers of ethylene or propylene oxide, 1,4 butane diol, 1,6 hexane diol, neopentyl glycol, dibromoneopenyl glycol, triisopropanol amine and the like. Typical relatively low equivalent weight polyamines include aliphatic polyamines such as ethylene diamine, hexamethylene diamine 1,4-diaminocyclohexane, aminoethylpiperazine, aminated poly(alkylene oxides) such as are available commercially under the names of Jeffamine D-400 and Jeffamine T-403 and aromatic polyamines such as described in U.S. Pat. No. 4,374,210 which is incorporated herein by reference.

When other isocyanate-reactive materials are employed herein, the secondary amine-terminated reactive product of a primary amine and polyepoxide generally comprises about 3 to 100, preferably 10 to 95, more preferably 10 to 60% of the combined weight of this reaction product and the other isocyanate-reactive materials.

When other isocyanate-reactive materials are employed herein, it is generally advantageous to blend these other isocyanate-reactive materials with the secondary amine terminated reactive product prior to reacting them with a polyisocyanate.

The conditions employed in preparing a polymer using a mixture of the secondary amine terminated reactive product and other isocyanate reacted materials depends somewhat on the reactivity of the other isocyanate reactive materials and the particular catalyst (if any) employed. Mixtures containing relatively large amounts of amine-terminated reactants tend to be highly reactive with polyisocyanates and are most typically reacted therewith in low or high pressure impingement mixing equipment such as the so called RIM (reaction injection molding) equipment. Such mixtures tend to require the use of little or no catalyst. On the other hand, mixtures containing significant proportions of polyols tend to react more slowly and are more readily adaptable to other casting methods if desired. Catalysts are generally required when significant proportions of polyols are used, particularly if a RIM processible system is desired.

Organic polyisocyanates which may be employed include aromatic, aliphatic and cycloaliphatic polyisocyanates and combinations thereof. Representative of these types are diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, and 3,3'-dimethyl-4,4'-diphenyl diisocyanate, the triisocyanates such as trifunctional polymethylene polyphenylisocyanates and tolylene-2,4,6-triisocyanate; and tetraisocyanates such as 4,4'-dimethyldiphenylmethane-2,2',5,5'-tetraisocyanate and the like.

A crude polyisocyanate may also be used in the practice of the present invention, such as the crude toluene diisocyanate obtained by the phosgenation of a mixture of toluene diamines or the crude diphenylmethylene diisocyanate obtained by the phosgenation of crude diphenylmethylenediamine. The preferred undistilled or crude isocyanates are disclosed in U.S. Pat. No. 3,215,652.

Alternatively, an isocyanate-terminated prepolymer or quasi-prepolymer prepared by reacting an excess of a polyisocyanate with a polyol of low or high equivalent weight may be employed as the polyisocyanate herein.

In addition to the aforementioned components, other optional ingredients may be employed herein for their usual purposes. Flame retardants are usefully employed herein, particularly phosphate esters and halogenated materials such as dibromoneopentyl glycol.

It is often desirable to employ a blowing agent herein to produce lower density polymers. Suitable blowing agents include those materials which vaporize or otherwise generate a gas under the conditions encountered in the polymerization reaction. Materials which boil under such conditions include low boiling halogenated hydrocarbons such as chlorotrifluoromethane, dichlorodifluoromethane, trichlorofluoromethane, methylene chloride, chloroform, trichloroethane and the like. Suitable materials which react to form a gas under such conditions include water and the so-called azo blowing agents. Materials which dehydrate to release gaseous water under such conditions including for example, magnesiums, sulfate, heptahydrate, sodium carbonate dedcahydrate sodium phosphate dodecahydrate, calcium nitrate, tetrahydrate, ammonium carbonate tetrahydrate and the like, are less preferably used as a blowing agent. High surface area particulate solids are also useful blowing agents, as described in U.S. Pat. No. 3,753,933. Preferred are water, halogenated hydrocarbons and mixtures thereof.

Preferably, sufficient of the blowing agent is employed to provide a polymer having a specific gravity from about 0.4 to about 1.2, more preferably from 0.8 to 1.0. However, low density polymers, i.e. foams, can also be prepared according to this invention.

A surfactant is often used in preparing polymers according to this invention, particularly when a blowing agent is employed. Suitable surfactants are well known and their use in preparing low density polymers is well understood. Preferred are silicone surfactants including B 8404, B 8014, B 8020, and B 8200 all available from Goldschmidt Chemicals; L-5303, L-5305, L-520 and L-540, all available from Union Carbide Corporation; and DC-190, DC-193, DC-196, and DC-197, all available from Dow Corning Corporation, and other silicone surfactants.

Suitable catalysts which may be employed herein include organometal compounds such as organotin, organomercury, and organolead compounds as described in U.S. Pat. No. 2,846,408. Tertiary amine catalysts such as triethylene diamine, triethyl amine, methmorpholine, N,N-dimethylaminoethyl piperadine and the like are also useful catalysts for the polymerization reaction. Generally, such catalysts, when used, are employed in amounts from about 0.002 to 2, preferably from about 0.01 to 1 part per 100 parts by weight of isocyanate-reactive materials employed in the preparation of the polymer.

In addition, other additives such as pigments, reinforcing fibers, fillers, antioxidants, stabilizers, flame retardants, inhibitors and the like are optionally employed herein for their usual purposes.

Generally, it is convenient to blend said optional ingredients with the adduct and other isocyanate reactive materials (if any) prior to the reaction thereof with the polyisocyanate to prepare a polymer according to this invention.

The polymers of this invention are characterized by having high modulus, high impact strength, and high heat distortion temperatures. Accordingly, such polymers are particularly useful in structural applications, such as in cabinetry, window frames, sporting goods and applications wherein the polymer is required to maintain a constant load.

The following examples are provided to illustrate the invention but not to limit the scope thereof. All parts and percentages are by weight unless otherwise indicated.

EXAMPLE 1

Preparation of Isopropylamine-Terminated Adduct of an Epoxy-Terminated-Tetrabromo Bisphenol A/Epichlorohydrin Resin To reactor equipped with a stirrer, reflux condenser, nitrogen sparge and temperature control are added 22.5 moles (1329.7 g.) of isopropyl amine and 691 grams of propylene glycol mono methyl ether. After heating to 40° C., 1.5 moles (1388.6 grams) of a 463 equivalent weight epoxy resin prepared from tetrabromobisphenol A and epichlorohydrin are added over 165 minutes. During the reaction the temperature increases to 55° C. A small portion of methylethyl ketone is added during the reaction. After the addition is complete, the reaction mixture is digested for 2 hours at 65° C. The mixture is then vacuum distilled to remove unreacted isopropyl amine and the solvents. The distillation is completed at 104° C. and 8 mm $H_g$ pressure.

The product is a clear resinous material with a melting point of 91° C. and an theoretical equivalent weight of 522. This product is hereinafter referred to as Adduct A.

Adduct B is prepared in like manner except that this time the epoxy resin has an equivalent weight of 451, and 18 moles of isopropyl amine are used. Adduct B has a melting point of 94° C., a theoretical equivalent weight of 510, and an observed equivalent weight of 517.

EXAMPLE 2

Preparation of Aniline-Terminated Adducts of Epoxy Resins

In a reactor equipped as described in Example 1 are added 15 moles (1396.5 grams) of aniline. After heating to 70° C., about 250 grams of the same epoxy resin employed to prepare Adduct A (dissolved in methylethyl ketone) and 322 grams of propylene glycol methyl ether are added. After heating to 85° C., about 1138.6 additional grams of the epoxy resin are added over 160 minutes. The mixture is then digested for about 2 hours at about 90° to 120° C. and the unreacted aniline and solvents are removed by vacuum distillation. The distillation is concluded at about 157° C. and 6 mm mercury pressure.

The product is a clear resinous material with a melting point of 90° C. and a theoretical equivalent weight of 556. This product is referred to hereinafter as Adduct C.

Adduct D is prepared in like manner, this time using 1.5 moles of a bisphenol A-epichlorohydrin adduct having an equivalent weight of about 947 as the epoxy resin. Adduct D has a melting point of 112° C. and an observed equivalent weight of about 1042 (theoretical equivalent weight=1040).

Adduct E is prepared in like manner, this time employing as the epoxy resin a bisphenol A-epichlorohydrin resin having an equivalent weight of about 549. Adduct E has a theoretical equivalent weight of about 642 and a melting point of 93° C.

EXAMPLE 3

Preparation of o-Ethyl Aniline-Terminated Adduct of an Epoxy Terminated Tetrabromobisphenol A-Epichlorohydrin Resin According to the procedure described in Example 2, 15 moles of ortho-ethyl aniline is reacted with 1.5 moles of the epoxy resin used to prepare Adduct B. The resulting product has a theoretical calculated equivalent weight of 570 and a melting point of 87° C. This adduct is referred to herein as Adduct F.

EXAMPLE 4

Hand-cast plaques are prepared from each of the following formulations.

TABLE I

| Ingredient | Parts By Weight | |
|---|---|---|
| | Sample No. 1 | Sample No. 2 |
| Polyol A[1] | 53 | 53 |
| Polyol B[2] | 25 | 25 |
| Diethylene glycol | 30 | 30 |
| Adduct C | 10 | 20 |
| Silicone Surfactant A[3] | 0.5 | 0.5 |
| R-8020[4] | 0.05% | 0.05% |
| Freon 11 | 6 | 6.5 |
| Tin Catalyst[5] | 0.05% | 0.05% |

TABLE I-continued

| Ingredient | Parts By Weight | |
|---|---|---|
| | Sample No. 1 | Sample No. 2 |
| 135 eq. wt. MDI[6] | 105 index | 105 index |

[1]The reaction product of aminoethyl ethanol amine and about 3 moles propylene oxide.
[2]A trifunctional copolymer of propylene oxide and ethylene oxide having a molecular weight of about 3000.
[3]A silicone surfactant commercially available as B-8404 from Goldschmidt.
[4]An amine catalyst commercially available from Air Products and Chemicals.
[5]UL-6, commercially available from Witco Chemical.
[6]A 135 equivalent weight polymethylene polyphenyl polyisocyanate commercially available as Rubinate M from Rubicon Chemical Corp.

All ingredients except the polyisocyanate are mixed in a large container. The polyisocyanate is added and the mixture is then vigorously stirred for about 10 seconds. The mixture is then poured into a ½" deep mold which has been preheated to 140° F. The mold is closed and maintained at about 140° F. for about 2.5 minutes. The molding is then removed and evaluated, with results as indicated in Table II. Additional ¼" moldings are prepared in like manner from Sample No. 1.

TABLE II

| | Sample No. 1 | Sample No. 2 |
|---|---|---|
| ½" moldings | | |
| Specific Gravity | 0.75 | 0.75 |
| Heat Distortion Temperature, 264 psi | 102° C. | 91° C. |
| Charpy Impact Strength, (ft-lb/in) | 4.84 | 5.34 |
| ¼" moldings | | |
| Specific Gravity | 0.823 | |
| Tensile Strength (psi) | 2500 | |
| Elongation | 5–10% | |
| Flexural Strength, (psi) | 6700 | |
| Flexural Modulus, (psi) | 233,000 | |

The resulting moldings are seen to exhibit excellent thermal and mechanical properties.

EXAMPLE 5

In a manner similar to that described in Example 4, ½" moldings are prepared and tested. The formulations and test results are as indicated in Table III.

TABLE III

| | Parts By Weight | | | |
|---|---|---|---|---|
| | Sample No. 3 | Sample No. 4 | Sample No. 5 | Sample No. 6 |
| Ingredient | | | | |
| Polyol A[1] | 53 | 50 | 50 | 53 |
| Polyol B[2] | 25 | 25 | 25 | 25 |
| Diethylene glycol | 30 | 30 | 30 | 30 |
| Silicone Surfactant A[3] | 1 | 1 | 1 | 1 |
| Adduct A | 0 | 0 | 0 | 20 |
| Adduct D | 20 | 0 | 0 | 0 |
| Adduct E | 0 | 30 | 0 | 0 |
| Adduct F | 0 | 0 | 30 | 0 |
| Silicone Surfactant B[4] | 0 | 0 | 0 | 1 |
| Freon 11 | 3.2% | 3.1% | 2.0% | 4.8% |
| 135 eq. wt. MDI[5] | 192.4 | 187.7 | 188.8 | 196.4 |
| R-8020[6] | 0.05 | 0.03 | 0.03 | 0.05 |
| Test Results | | | | |
| Specific Gravity | 0.80 | 0.79 | 0.80 | 0.83 |
| Heat Distortion Temp. 264 psi (° C.) | 100 | 92 | 95 | 97 |
| Charpy Impact[7] (ft-lb/in) | 5.05 | 4.12 | 3.00 | 3.84 |

[1]The reaction product of aminoethylethanolamine and about 3 moles propylene oxide.
[2]A trifunctional copolymer of propylene oxide and ethylene oxide having a molecular weight of about 3000.
[3]A silicone surfactant commercially available as B-8404 from Goldschmidt.
[4]DC-193, sold by Dow Corning Corporation
[5]A 135 equivalent weight polymethylene polyphenyl polyisocyanate commercially available as Rubinate M from Rubicon Chemical Corp.
[6]An amine catalyst sold by Air Products and Chemicals.
[7]Unnotched

EXAMPLE 6

Plaques of ¼" and ½" thickness are prepared from Formulation Nos. 7 and 8 by reaction injection molding using a Krauss-Maffei PU-40 RIM machine. The "A" and "B" sides are preheated to a temperature of 115° F. Demold time is about two minutes. The mold temperature is about 135° F. The formulations used and the results of testing are indicated in Table IV. Tensile, flexural and Gardner Impact testing is preformed on ¼" moldings. Heat distortion and Charpy Impact testing is done on ½" samples.

TABLE IV

| | Parts By weight | |
|---|---|---|
| | Sample No. 1 | Sample No. 2 |
| Ingredient | | |
| Polyol A[1] | 50 | 50 |
| Polyol B[2] | 25 | 25 |
| Diethylene glycol | 30 | 30 |
| Adduct C | 20 | 0 |
| Adduct B | 0 | 20 |
| Silicone Surfactant[3] | 1 | 1 |
| 135 eq. wt. MDI[4] | 103 index | 103 index |
| R-8020[5] | 0.04% | 0.04% |
| Test Results | | |
| Specific Gravity | 1.19 | 1.16 |
| Heat Distortion Temp. 264 psi (°C.) (½" samples) | 125 | 126 |
| Charpy Impact (ft-lb/in) (½" samples) | 4.6 | 5.2 |
| Gardner Impact, (in-lb/in) | 55 | 45 |
| Flexural Strength (psi) | 15,500 | 17,900 |
| Flexural Modulus (psi) | 325,000 | 357,000 |
| Tensile Strength (psi) | 9,800 | 10,300 |
| Elongation (%) | 8.0 | 9.1 |

[1]The reaction product of aminoethyl ethanol amine and about 3 moles propylene oxide.
[2]A trifunctional copolymer of propylene oxide and ethylene oxide having a molecular weight of about 3000.
[3]A silicone surfactant commercially available as B-8404 from Goldschmidt.
[4]A 135 equivalent weight polymethylene polyphenyl polyisocyanate commercially available as Rubinate M from Rubicon Chemical Corp.
[5]An amine catalyst sold by Air Products and Chemicals.

EXAMPLE 7

A series of V-O fire rated polymers are prepared from the formulation specified in Table V, and molded under the conditions described in Example 6, except the "A-side" temperature is about 100° F. and the mold temperature is about 140° F. The results of testing of the resulting moldings are as reported in Table V. In Sample Nos. 9 and 12 the isocyanate index is 105, and in Sample Nos. 10 and 11 the index is 110. Tensile and flexural testing is performed on ¼" moldings and heat-distortion and Charpy Impact testing is done on ½" moldings.

TABLE V

| Ingredient | Parts By Weight |
|---|---|
| Polyol A[1] | 53 |
| Polyol B[2] | 25 |
| Diethylene glycol | 10 |
| Triethylene glycol | 5 |
| Adduct C | 30 |
| Phosphate Ester[3] | 15 |
| Silicone Surfactant[4] | 1 |
| Freon 11 | 15 |
| R-8020[5] | 0.05% |
| 135 eq. wt. MDI[6] | variable |

| Test Results | Sample No. 9 | Sample No. 10 | Sample No. 11 | Sample No. 12 |
|---|---|---|---|---|
| Density | 1.17 | 1.15 | 0.81 | 0.68 |
| Heat Distortion Temp. 264 psi (°C.) | 112 | 112 | 98 | 98 |
| Charpy Impact (ft-lb/in) | 6.7 | 4.9 | 5.3 | 3.0 |
| Flexural Strength (psi) | 13,900 | 13,200 | 8,750 | 6,100 |
| Flexural Modulus (psi) | 334,000 | 306,000 | 229,000 | 171,000 |
| Tensile Strength (psi) | 10,200 | 8,000 | 5,200 | 2,600 |
| UL-94 Rating[7] | V-0 | V-0 | V-0 | Not tested |

[1]The reaction product of aminoethylethanolamine and about 3 moles propylene oxide.
[2]A trifunctional copolymer of propylene oxide and ethylene oxide having a molecular weight of about 3000.
[3]FYROL PCF, available from Stauffer Chemical Company.
[4]A silicone surfactant commercially available from Goldschmidt.
[5]An amine catalyst available from Air Products and Chemicals.
[6]A 135 equivalent weight polymethylene polyphenyl polyisocyanate commercially available as Rubinate M from Rubicon Chemical Corp.
[7]UL-94 testing performed by The Dow Chemical Company.

EXAMPLE 8

Plaques are prepared and tested according to procedure described in Example 6 from Formulation Sample Nos. 13 and 14. These formulations and the results of testing the product plaques are as reported in Table VI. Tensile and flexural properties are tested on ¼" samples.

TABLE VI

| | Parts By Weight | |
|---|---|---|
| | Sample No. 13 | Sample No. 14 |
| Ingredient | | |
| Polyol A[1] | 53 | 53 |
| Polyol B[2] | 25 | 25 |
| Diethylene glycol | 10 | 0 |
| Triethylene glycol | 5 | 0 |
| 1,4-butane diol | 0 | 15 |
| DBNPG[3] | 5 | 5 |
| Adduct C | 30 | 30 |
| Aminated Polyether A[4] | 20 | 0 |
| Aminated Polyether B[5] | 0 | 25 |
| Phosphate Ester[6] | 15 | 15 |
| Silicone Surfactant[7] | 1.5 | 1.5 |
| R-8020[8] | 0.05% | 0.02% |
| Tin catalyst[9] | 0.02% | 0 |
| Freon 11% | 6.5 | 5.5 |
| 135 eq. wt. MDI[10] | 102 index | — |
| A blended MDI[11] | — | 102 index |
| Test Results | | |
| Specific Gravity | 0.81 | 0.93 |
| Heat Distortion Temp. 264 psi (°C.) | 71 | 78 |
| Flexural Strength (psi) | 8,000 | 8,000 |
| Flexural Modulus (psi) | 203,000 | 202,000 |
| Tensile Strength (psi) | 3,300 | 4,300 |
| Elongation (%) | 9.0 | 16.0 |
| UL-94 rating[12] | Not tested | V-1 |

[1]The reaction product of aminoethylethanolamine and about 3 moles propylene oxide.
[2]A trifunctional copolymer of propylene oxide and ethylene oxide having a molecular weight of about 3000.
[3]Dibromoneopentylglycol
[4]Jeffamine D-2000, sold by Texaco Chemicals
[5]A 50% aminated, 1650 equivalent weight, ethylene oxide-capped polypropylene oxide triol.
[6]Fryol PCF, sold by Stauffer Chemical Company.
[7]A silicone surfactant commercially available as B-8404 from Goldschmidt.
[8]An amine catalyst sold by Air Products and Chemicals
[9]UL-6, sold by Witco Chemical
[10]A 135 equivalent weight polymethylene polyphenyl polyisocyanate commercially available as Rubinate M from Rubicon Chemical Corp.
[11]A blend of 75 weight percent Rubinate M (see note 10) and 25 weight percent of a 170 equivalent weight prepolymer of 4,4'-methylene diphenyl/diisocyanate and a 5000 molecular weight, trifunctional, ethyleneoxide-capped poly(propylene oxide).
[12]Tested by The Dow Chemical Company.

EXAMPLE 9

Following the general procedure of Example 6, ½" and ¼" plaques are prepared from each of Formulation Sample Nos. 15 and 16. The compositions of these formulations and results of testing of the plaques prepared therefrom are as indicated in Table VII. All testing is done on the ¼" plaques except for Charpy Impact and Heat Distortion testing.

TABLE VII

| | Parts By Weight | |
|---|---|---|
| | Sample No. 15 | Sample No. 16 |
| Ingredient | | |
| Polyol A[1] | 53 | 50 |
| Aminated Polyether C[2] | 25 | 25 |
| Diethylene glycol | 10 | 30 |
| Triethylene glycol | 5 | 0 |
| DBNPG[3] | 5 | 12 |
| Adduct C | 30 | 24 |
| Phosphate Ester[4] | 15 | 15 |
| Freon 11 (%) | 16.2 | 18.5 |
| R-8020[5] | 0.05% | 0.02% |
| Tin catalyst[6] | 0 | 0.02% |
| 135 eq. wt. MDI[7] | 161.6 | 0 |
| 143 eq. wt. MDI[8] | 0 | 211.4 |
| Specific Gravity | 0.82 | 0.82 |
| Flexural Modulus (psi) | 230,000 | 215,000 |
| Flexural Strength (psi) | 10,150 | 9,225 |
| Tensile Strength (psi) | 4,300 | 4,300 |
| Elongation (%) | 4.58 | 6.19 |
| Gardner Impact (in-lb) | 52 | 100 |
| Charpy Impact (ft-lb/in) | Not tested | 5.49 |
| Heat Distortion Temp. 264 psi (°F.) | Not tested | 143 |

[1]The reaction product of aminoethylethanolamine and about 3 moles propylene oxide.
[2]Jeffamine T-5000, sold by Texaco Chemical Company.
[3]dibromoneopentyglycol
[4]Fyrol PCF, sold by Stauffer Chemical Company.
[5]An amine catalyst commercially available from Air Products and Chemicals.
[6]UL-6, sold by Witco Chemical
[7]A 135 equivalent weight polymethylene polyphenyl polyisocyanate commercially available as Rubinate M from Rubicon Chemical Corp
[8]A 143 equivalent weight polypropylene polyphenyl-polyisocyanate sold as LF-168 by Rubicon Chemical Company.

What is claimed is:

1. A polyurea containing polymer comprising a product obtained in the reaction of a reaction mixture comprising (a) a polyisocyanate and (b) a secondary amine terminated reaction product of a primarily monofunctional primary amine containing compound and a polyepoxide.

2. A polymer of claim 1 wherein said monofunctional primary amine contains from about 2 to about 30 carbon atoms.

3. The polymer of claim 2 wherein said reaction mixture further comprises at least one relatively high equivalent weight compound having from about 2 to 4 hydroxyl groups, amine groups or mixtures thereof and an equivalent weight from about 250 to 5000.

4. The polymer of claim 3 wherein said relatively high equivalent weight compound comprises an amine-initiated polyol.

5. The polymer of claim 2, 3 or 4 wherein said polyepoxide comprises a reaction product of a bisphenol or halogenated bisphenol and an epihalohydrin and has an average equivalent weight from about 170 to about 2000.

6. The polymer of claim 5 wherein said monofunctional primary amine is an alkyl amine having from about 2-8 carbon atoms or an aromatic amine having about 6-12 carbon atoms.

7. The polymer of claim 2 or 3 wherein said polyepoxide comprises a reaction product of an epihalohydrin and an alkylene glycol or a polyether polyol.

8. The polymer of claim 7 wherein said monofunctional primary amine is an alkyl amine having from about 2-8 carbon atoms or an aromatic amine having about 6-12 carbon atoms.

9. The polymer of claim 6 wherein said secondary amine-terminated reaction product comprises from about 10 to 60 percent by weight of the isocyanate-reactive materials present in said reaction mixture.

10. The polymer of claim 8 wherein said secondary amine-terminated reaction product comprises from about 10 to 60 percent by weight of the isocyanate-reactive materials present in said reaction mixture.

11. The polymer of claim 2 or 3 wherein said reaction mixture further comprises a relatively low equivalent weight compound having from about 2-8 hydroxyl groups, amine groups or mixtures thereof, and an equivalent weight from about 30 to about 250.

12. The polymer of claim 2 further comprising a blowing agent.

13. An active-hydrogen containing composition comprising (a) a relatively high equivalent weight compound having from about 2 to 4 hydroxyl groups, amine groups or mixtures thereof and an equivalent weight from about 250 to 5000, and (b) a secondary amine terminated reaction product of a primarily monofunctional primary amine-containing compound and a polyepoxide.

14. The active hydrogen containing composition of claim 13 wherein said relatively high equivalent weight compound comprises at least one of an amine terminated polyether and an amine-initiated polyol.

15. The active hydrogen containing composition of claim 13 or 14 further comprising a relatively low equivalent weight compound having from about 2-8 hydroxyl groups, amine groups or mixtures thereof and an equivalent weight from about 30 to about 250.

* * * * *